BINARY DIGITAL COMPUTER

Filed April 30, 1965 5 Sheets-Sheet 1

INVENTOR.
JOHN T. GODFREY
BY

INVENTOR.
JOHN T. GODFREY
BY
Walter J Wenerdorf h
attorney

INVENTOR.
JOHN T. GODFREY
BY
Walter J. Wesenberg Jr.
attorney

INVENTOR.
JOHN T. GODFREY
BY
Walter T. Wannenberg
attorney

INVENTOR.
JOHN T. GODFREY
BY
Walter F. Wessendorf Jr.
Attorney

United States Patent Office 3,390,471
Patented July 2, 1968

3,390,471

BINARY DIGITAL COMPUTER

John T. Godfrey, Scotia, N.Y., assignor to E.S.R., Inc., Montclair, N.J., a corporation of New Jersey
Filed Apr. 30, 1965, Ser. No. 452,117
9 Claims. (Cl. 35—30)

ABSTRACT OF THE DISCLOSURE

The invention herein disclosed comprises a plurality of flip-flops, carried upon an inclined table or tables impulsed by balls rolling down said table or tables by gravitational forces, the path of said balls being directed by said flip-flops and said flip-flops being moved by said balls so as to allow methematical computations to be effected upon binary numbers to which the flip-flops are set.

This invention relates to a binary digital computer; and, therewith, two embodiments of games of associative relationship.

The advent of the high speed electronic digital computer has left in its wake a void or gap in the ability of the student to understand and comprehend what a computer is all about, how it works, what kind of problems the computer can solve, how a computer can be instructed to solve problems, etc.

Accordingly, it is deemed that the binary digital computer of this invention, completely mechanical in construction and operation, permits the achievement of elementary level instruction in computers and with the following inclusive but not necessarily exclusive benefits: the workings of the computer of this invention are almost self-evident; no specialized knowledge, such as electronics, is required for the student to understand this computer invention and the practical application of its concepts; the computer invention is of simple but durable construction and inexpensive of manufacture; the principles of the operation of the computer are clearly observable and discernable not only because of the very elements and interrelationship of these elements of which the computer is constructed, but also the very slowness in the operation of these elements; and the computer is interesting and entertaining in and of itself, and, as such, is a further aid in understanding and comprehending the concepts taught thereby.

Inclusive among the concepts which may be explained and understood by this computer invention are the following: the binary number system; the simplicity of machine design for binary arithmetic; the logical action of a flip-flop circuit; the use of the flip-flop to construct a binary accumulator in binary; the rules for binary counting and addition; modular arithmetic; the use of two's complement arithmetic to achieve subtraction with only its add capability; accumulator overflow; accumulator shifting; the multiply by two effect of shifting left; the divide by two effect of shifting right; binary multiplication; the storage of binary bits of information in registers; destructive versus nondestructive read-out of a register; the function of impulses to alter flip-flops and to interrogate registers.

These benefits and other benefits of the invention should be understood, discerned and appreciated by reference to the accompanying drawings wherein like reference numerals refer to similar parts throughout the several views, in which.

Figure 1:
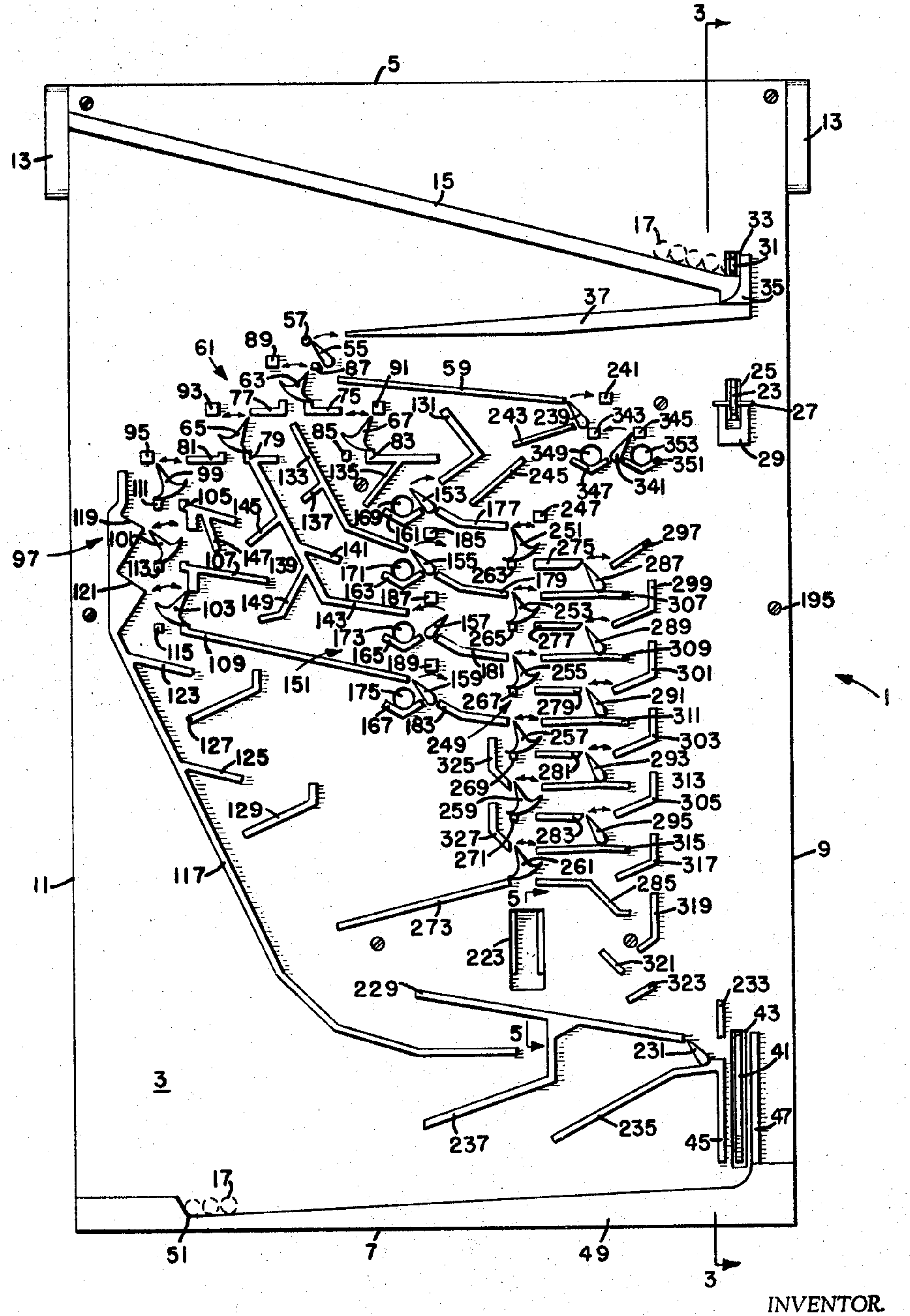
FIG. 1 is a top view of the invention.

In FIG. 1 of the drawings, reference numeral 1 generally refers to the invention showing a table surface 3 having a top 5, bottom 7, right side 9 and left side 11. Table surface 3 is inclined by two depending legs 13, each one of which is suitably secured to the right and left sides of the table surface 3 at the top portions thereof.

A decline guide 15 functions as a storage rack for the balls 17 which are released one at a time by the gating mechanism generally referred to by 19.

Figure 3:
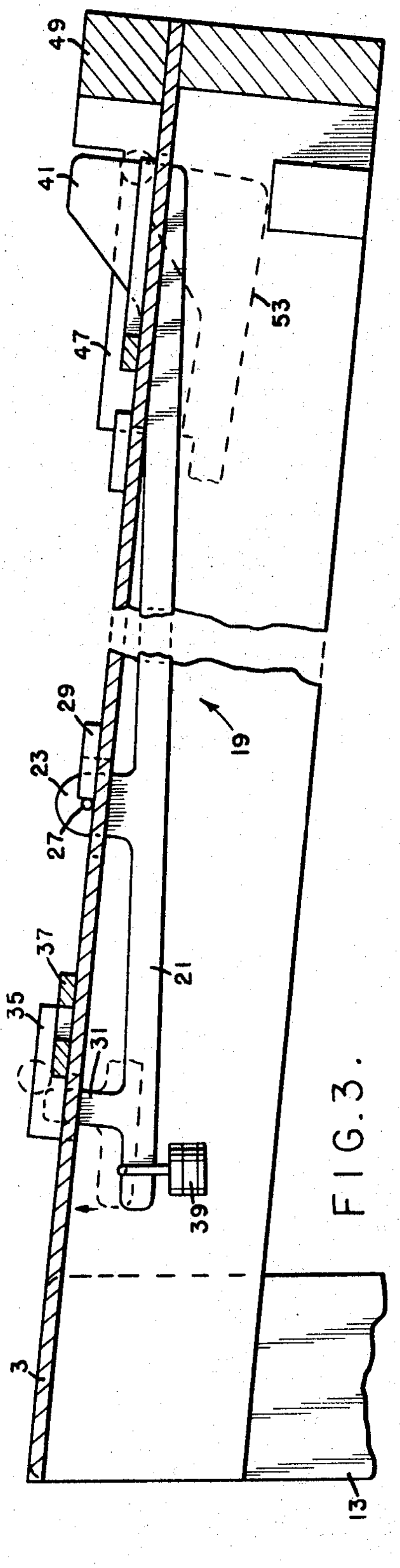
FIG. 3 is a view taken along the line 3—3 of FIG. 1.

Gating mechanism 19, shown more discernibly in FIG. 3 comprises a lever 21 having an upstanding ear 23 which projects through a complemental slot 25 formed through the table surface 3 and which ear 23 receives transversely therethrough a cross pin 27 abutting U-shaped mounting block 29 fixed to table surface 3 for pivotal mounting thereby of lever 21 relative to table surface 3, as shown. Lever 21 has a lifting tab 31 upstanding from the left lateral portion of the lever 21, as viewed in FIG. 3, and which lifting tab 31 upon its upward movement projects through a complemental slot 33 formed through table surface 3 in the region of the lowermost point of the decline guide 15 of the racked balls 17 and engages a ball 17 to lift same over decline guide 15. Fixed to the table surface 3 adjacent the lower end of decline guide 15 is an L-shaped guide 35 arcuately curved inwardly and leading to a decline guide 37 fixed to table surface 3. Upon a ball 17 being lifted over decline guide 15, the ball will be constrained by guide 35 to roll downwardly along decline guide 37. As further viewed in FIG. 3, a counterweight 39 is carried upon the left portion of lever 21 and an upstanding trigger 41 is formed at the right terminal portion of lever 21. Trigger 41 in its normal inoperative position is constrained by counterweight 39 to project through complemental slot 43 formed through table surface 3 between aligned parallel guides 45 and 47 fixed to table surface 3. The relative distance of lever 21 measured from cross pin 27 to trigger 41 is such that a mechanical advantage of 3 or 4 to 1 is achieved to effectuate, upon a ball 17 moving between guides 45 and 47 and upon trigger 41, the downward movement of trigger 41 and upward movement of lifting tab 31 for automatic gating of another ball 17. Upon further continued movement of a ball 17 along trigger 41 between guides 45 and 47, the ball 17 will be guided by bottom guide 49 fixed to table surface 3 and directed to a lowermost collecting point 51 formed in bottom guide 49. Hence it should be appreciated that the gating mechanism 19 will function automatically for a succeeding racked ball 17 so long as the preceding ball 17 moves upon trigger 41 between guides 45 and 47. For initial actuation of the computer, the student normally depresses trigger 41 to its position 53 indicated in FIG. 3.

Figure 2:
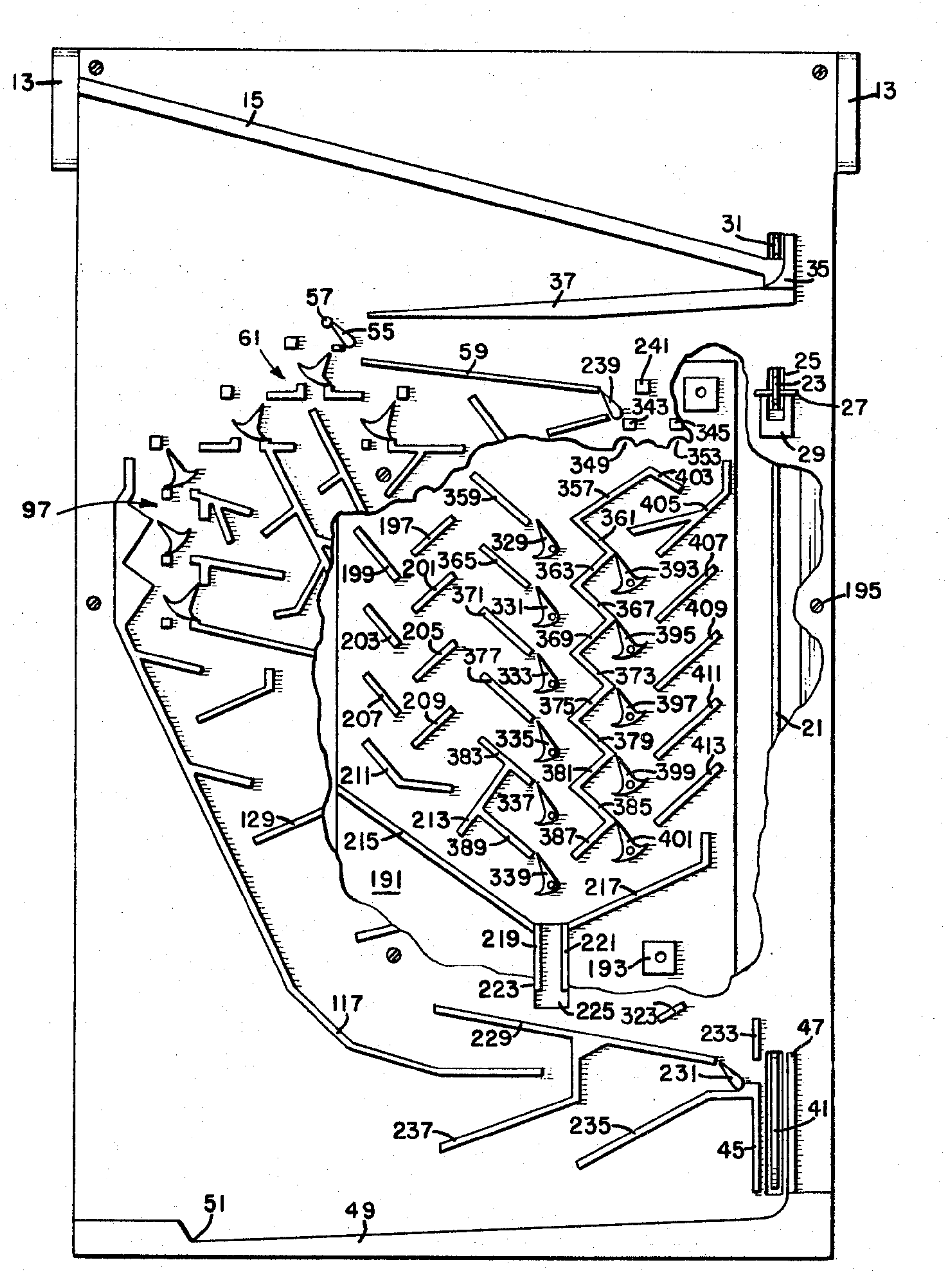
FIG. 2 is a top view of the invention partly broken away to show the lower table surface.

A ball 17 leaving the left end of decline guide 37 will travel downwardly and be guided by multiply switch 55 to take a path to the right or to the left depending upon the position of multiply switch 55. In FIGS. 1 and 2, multiply switch 55 is shown in its off-position. Multiply switch 55 is a manually movable lever pivotally mounted on a pin fixed to table 3. Arcuate movement of the end of lever 55 is limited by its abutment against post 57 fixed to table 3 or by its abutment against the left end portion of decline guide 37. The multiply switch 55 is "off" when its lever end abuts post 57, and multiply switch 55 is "on" when its lever end abuts the left end portion of decline guide 37. The multiply switch 55 in its "off" position will direct a ball 17 to decline guide 59 fixed to table surface 3. The multiply switch in its "on" position will direct a ball 17 to the distributor generally referred to by reference numeral 61.

Figure 7:
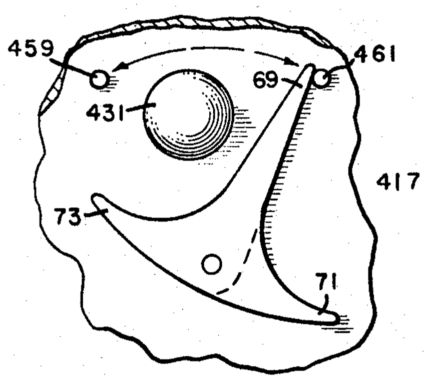
FIG. 7 is a view of a flip-flop as utilized in FIG. 6.

Distributor 61 comprises the three binary flip-flops, 63, 65 and 67, and with its associated guides to be described, functions to cyclically distribute and direct balls 17 in four discrete but nonsequential paths. Each of the binary flip-flops 63, 65 and 67 may be characterized as an inverted T in configuration. Each of the binary flip-flops 63, 65 and 67 is pivotally mounted on its respective pin fixed to table 3. With reference to FIG. 7, a flip-flop per se as utilized in this invention may be characterized as structurally embodying a stem 69, right arm 71 and left arm 73. Arcuate movement of flip-flop 63 is limited by abutment of its right arm with the small leg of L-shaped guide 75 and by abutment of its left arm with the small leg of L-shaped guide 77. Arcuate movement of flip-flop 65 is limited by abutment of its right arm with the small leg of L-shaped guide 79 and by abutment of its left arm with the small leg of L-shaped guide 81. Arcuate movement of flip-flop 67 is limited by abutment of its right arm with the small leg of L-shaped guide 83 and by abutment of its left arm with limit block 85. The function of each of the blocks 87, 89, 91, 93 and 95 is to slow down the speed of movement of a ball 17 when the ball 17 engages one of these blocks.

Multiplier register generally referred to by reference numeral 97 comprises the three binary flip-flops 99, 101 and 103 pivotally mounted on respective pins fixed to table 3. Arcuate movement of flip-flops 99, 101 and 103 is limited by abutment of each of their respective right arms with respective decline guides 105, 107 and 109 and by abutment of each of their respective left arms with respective limit blocks 111, 113 and 115. A ball 17 constrained to travel along the right side of decline guide 117 will be directed in its movement and have its speed of movement slowed down by decline blocks 119 and 121 and decline guides 123 and 125 in cooperation with decline guides 127 and 129.

A flip-flop is a bistable circuit, element or device which may take on one of two values or positions. In an electronic digital computer a flip-flop may be a circuit having one of two possible voltage states such that an impulse will flip it to the opposite state. Flip-flop circuits which switch voltage levels upon impulse are dynamic in operation and generally comprise transistors or electron tubes capable of being switched in less than a millionth of a second. Slower flip-flop circuits may be characterized as being static and require a change in magnetism of a magnetic element with typical switching time measured by a few millionths of a second. The flip-flops utilized in the invention are analogous to the static-flip elements characterized. A plurality of these same mechanical flip-flops, as utilized in the multiplier register 97 described, are utilized in the binary accumulator register to be described. In the multiplier register 97 when either one of the flip-flops 99, 101 or 103 have or are impulsed by a ball 17 to have their respective left arms abutting respective limit blocks 111, 113 or 115 such position is designated the "1" position; and when either one of the flip-flops 99, 101 or 103 have or are impulsed by a ball 17 to have their respective right arms abutting respective decline guides 105, 107 or 109 such position is designated the "0" position. Indicia to reflect these two positions may be printed on the table surface 3 or may be physically carried by the flip-flops 99, 101 and 103. It should be noted that gravity holds the flip-flops in their positions or states because the flip-flops are constructed to have their centers of gravity above their pivot points.

With reference to the "1" position or state of flip-flop 99 shown in FIG. 1, a ball 17 travelling down the right side of the stem of flip-flop 99 and engaging its right arm will cause flip-flop 99 to be impulsed and switch the state of flip-flop 99 to the "0" position. The ball will exit to its right along decline guide 105. Three capabilities may be attributed from the functional description of flip-flop 99: the positions "0" and "1" may represent the binary digits "0" and "1"; upon being impulsed by ball 17 flip-flop 99 changed its state to the opposite state; and the path of ball 17 was directed to the right because of the prior state or position of flip-flop 99. The last capability permits flip-flop 99 to be "interrogated" or "read-out" with the path of the ball on exit from flip-flop 99 answering the question as to the prior state of flip-flop 99.

When a ball 17 exits from the right of flip-flop 67, it will be directed in its movement and have its speed slowed down by L-shaped decline guide 131. When a ball 17 exits from the left of flip-flop 67, it will be directed in its movement by decline guides 133 and 135 and have its speed slowed down by declined guide 135. When a ball 17 exits from the right of flip-flop 65, it will be directed in its movement and have its speed slowed down by decline guides 79, 133, 137, 139, 141 and 143. When a ball 17 exits from the right of flip-flop 99, it will be directed in its movement and have its speed slowed down by decline guides 105, 145, 147, 107, 149 and 109. When a ball 17 exits from the right of flip-flop 101, it will be directed in its movement and have its speed slowed down by decline guides 107, 149 and 109.

The multiplicand register generally referred to by reference numeral 151 comprises the four pivotally mounted lever switches 153, 155, 157 and 159. Guides 161, 163, 165 and 167, and holes 169, 171, 173 and 175 are to the left and decline guides 177, 179, 181 and 183 are to the right of respective lever switches 153, 155, 157 and 159. Respective lever switches 153, 155, and 157 and 159 will assume the "1" position upon abutment with respective guides 161, 163, 165 and 167 and the "0" position upon abutment with respective guides 177, 179, 181 and 183. Respective blocks 185, 187 and 189 function to slow down the speed of a ball 17 leaving the end of respective decline guides 133, 143 and 109. Aligned below table surface 3 is a lower table surface 191 separated by spacer blocks 193 and held in securement by screws 195. Switch 157 is shown in FIG. 1 in its "0" position such that when a ball 17 leaves the end of decline guide 143, engage and be slowed down by block 187, engage and be guided by the left side of switch 157 into hole 173 thereupon dropping to lower table surface 191.

Aligned with holes 169, 171, 173 and 175 are decline guides 197, 199, 201, 203, 205, 207, 209 and 211, and which together with decline guides 213 and 215 function to direct the movements of and slow the speed of any ball 17 dropping through one of the holes 169, 171, 173 and 175. The lower ends of decline guides 215 and 217 converge in abutting relationship with the upper portions of respective guides 219 and 221 of chute 223 having a flat track 225 disposed through a complemental slot 227 formed in table surface 3 and whose upper and lower terminal portions are in contiguous relationship with respective lower table surface 191 and table surface 3. Hence a ball 17 rolling along either decline guide 215 or 217 will be directed to chute 223 upwardly to table surface 3 and thence to and along decline guide 229 to the auto-manual switch 231 which is a pivotally mounted lever having an automatic position and a manual position.

The automatic position of switch 231 is as shown in FIGS. 1 and 2 when the end of lever abuts the lower end of decline guide 229. When switch 231 is on automatic, a ball 17 traveling along decline guide 229 will have its speed slowed by engagement with limit guide 233 and thence will be directed by lever 231 between guides 45 and 47 for automatic gating of another ball 17 as was previously described. The manual position of switch 231 will be the abutment of the end of lever 231 with limit guide 233, and, in such manual position, a ball 17 traveling along decline guide 229 will have its speed slowed by engagement with lever 231 and will be directed by lever 231 in an opposite direction along decline guide 235 to bottom guide 49 and its lowermost collecting point 51.

A ball 17 further traveling along decline guide 117 will have its speed slowed by decline guide 237 and directed in an opposite direction along decline guide 237 to bottom guide 49.

The add-one switch 239 is a pivotally mounted lever having an "off" position shown in FIGS. 1 and 2 where the end of lever 239 abuts the lower end of decline guide 59 and an "on" position when the end of lever 239 abuts limit block 241. When switch 239 is in its "on" position, a ball 17 traveling along decline guide will be slowed down and directed by lever 239 in an opposite direction along decline guide 243, will be slowed down upon engagement with decline guide 131 and directed along decline guide 245 to travel along decline guide 177 to engage and be slowed down by block 247.

The binary accumulator register generally referred to by reference numeral 249 is a 6 binary digit or 6 "bit" register comprising six pivotally mounted, binary flip-flops 251, 253, 255, 257, 259 and 261 shown in FIG. 1 as being in their "0" positions with their left arms abutting respective limit blocks 263, 265, 267, 269, 271 and decline guide 273. Flip-flops 251, 253, 255, 257, 259 and 261 are in their "1" positions when their right arms abut respective guides 275, 277, 279, 281, 283 and 285. The accumulator register 249 is read from the positions of flip-flops 261, 259, 257, 255, 253 and 251 with the corresponding binary number $(fedcba)_2$ convertible to base "10" by conventionally evaluating the polynomial $$f.2^5+e.2^4+d.2^3+c.2^2+b.2^1+a.2^0$$

To the right of binary accumulator register 249 are the five accumulator mode switches 287, 289, 291, 293 and 295: each one of which is a pivotally mounted lever. As shown in FIG. 1, when the ends of levers 287, 289, 291, 293 and 295 abut respective guides 275, 277, 279, 281 and 283, levers 287, 289, 291, 293 and 295 are in their "add" positions. When the ends of levers 287, 289, 291, 293 and 295 abut respective decline guides 297, 299, 301, 303 and 305, levers 287, 289, 291, 293 and 295 are in their "complement" positions.

The six bit register 249 can be utilized to count up to 63=(111111). If any number of balls 17 up to and including sixty-three balls were racked on decline guide 15 and successively triggered one at a time the result could be reflected in register 249. To accomplish this intended result of reflecting in register 249 an arbitrary number of balls 17 counted by triggering of same successively, the multiply switch 55 would be manipulated to its "off" position, the add-one switch 239 would be manipulated to its "on" position, the flip-flops 251, 253, 255, 257, 259 and 261 manipulated to their "0" positions and the automanual switch 231 optionally manipulated to its automatic or manual position. The first ball triggered will travel along decline guide 37, will be slowed down upon engaging multiply switch 55 and travel along switch 55, will travel along decline guide 59, will be slowed down upon engaging add-one switch 239 and will travel along switch 239, will travel along decline guide 243, will be slowed down upon engaging decline guide 131, will be slowed down upon engaging decline guide 245 and will travel along decline guide 245, will be slowed down upon engaging decline guide 177 and will travel along decline guide 177, as will all other balls 17 taking the same path. The first ball 17 will further be slowed down upon engaging block 247, will be slowed down upon engaging flip-flop 251 and impulse flip-flop 251 to its "1" position, travel along guide 275, will be slowed down upon engaging decline guide 297, will be slowed down upon engaging mode switch 287 and will travel along mode switch 287, will be slowed down upon engaging guide 307 and will travel along guide 307, will be slowed down upon engaging decline guide 299 and will travel along decline guide 299, will be slowed down upon engaging mode switch 289 and will travel along mode switch 289, will be slowed down upon engaging guide 309 and will travel along guide 309, will be slowed down upon engaging decline guide 301 and will travel along decline guide 301, will be slowed down upon engaging mode switch 291 and will travel along mode switch 291, will be slowed down upon engaging guide 311 and will travel along guide 311, will be slowed down upon engaging decline guide 303 and will travel along decline guide 303, will be slowed down upon engaging mode switch 293 and will travel along mode switch 293, will be slowed down upon engaging guide 313 and will travel along guide 313, will be slowed down upon engaging decline guide 305 and will travel along decline guide 305, will be slowed down upon engaging mode switch 295 and will travel along mode switch 295, will be slowed down upon engaging guide 315 and will travel along guide 315, will be slowed down upon engaging decline guide 317 and will travel along decline guide 317, will be slowed down upon engaging decline guide 285 and will travel along decline guide 285, will be slowed down upon engaging decline guide 319 and will travel along decline guide 319, will be slowed down upon engaging decline guide 321 and will travel along decline guide 321, will be slowed down upon engaging decline guide 323 and will travel along 323, will be slowed down upon engaging 229 and will travel along 229 and then depending upon the position of auto-manual switch 231 will either be slowed down upon engaging with 231 and will travel along 231, will be slowed down upon engaging decline guide 235 and will travel along decline guide 235, or will be slowed down upon engaging limit guide 233, will be slowed down upon engaging switch 231 and will travel along switch 231 and thereafter automatically gate another ball 17 as described previously. After this first ball register 249 will read 1=(000001). The second ball triggered will be slowed down upon engaging flip-flop 251 and will impulse flip-flop 251 to its "0" position, will be slowed down upon engaging and will travel along decline guide 179, will be slowed down upon engaging guide 307, will be slowed down upon engaging flip-flop 253, will impulse flip-flop 253 to its "1" position, will be slowed down upon engaging guide 277 and will travel along guide 277; and then will follow the path of the first ball 17, and upon completion of the path of the second ball 17, register 249 will read 2=(000010).

The actions of successive balls 17, their impulsing of the flip-flops of register 249 and their paths of travel should not be difficult to appreciate and discern with reference to FIG. 1 of the drawings. When register 249 reads 15=(001111), the sixteenth ball will necessarily impulse flip-flops 251, 253, 255 and 257 to their "0" positions, will be slowed down upon engaging decline guide 325 and will travel along decline guide 325, will be slowed down upon engaging guide 313, will be slowed down upon engaging flip-flop 259 and will impulse flip-flop 259 to its "1" position and then register 249 will read 16=(010000). When register 249 reads 31=(011111), the thirty-second ball will successively impulse flip-flops 251, 253, 255, 257 and 259 to their "0" positions, will be slowed down upon engaging decline guide 327 and will travel along decline guide 327, will be slowed down upon engaging guide 315, will be slowed down upon engaging flip-flop 261 and will impulse flip-flop 261 to its "1" position and then register 249 will read 32=(100000).

When the flip-flops 251, 253, 255, 257, 259 and 261 of the binary accumulator register 249 are in their "1" positions, the binary accumulator register 249 reads 63 =(111111), and when the auto-manual switch 231 is in its automatic position for the gating of the balls 17 racked on decline guide 15, the sixty-fourth ball gated will successively impulse the flip-flops 251, 253, 255, 257, 259 and 261 of the binary accumulator register 249 to their "0" positions; and this sixty-fourth impulsing ball will travel along the path of decline guides 273, 117 and 237, thereby rendering inoperative the automatic gating of balls 17 racked on decline guide 15. This described phenomenon is attributable to accumulator "overflow" as will be described.

The binary digital computer can be utilized for the addition of two addends with the sum of such addition reflected in the binary accumulator register 249 by means of its flip-flops 251, 253, 255, 257, 259 and 261. To operate the binary digital computer for the addition of two addends, the auto-manual switch 231 is positioned in its automatic position for the automatic gating of the balls 17 racked on decline guide 15, multiply switch 55 is manipulated to its "on" position, the flip-flops 63, 65 and 67 of distributor 61 are positioned in their positions shown in FIG. 1 of the drawings, flip-flop 99 of the multiplier register 97 is positioned in its "1" position and flip-flops 101 and 103 of the multiplier register 97 are positioned in their "0" positions. When the binary digital computer is utilized for addition, the multiplicand register 151 may be considered as functioning as a memory register. The one addend is set into register 151 by the appropriate manipulation of the lever switches 153, 155, 157 and 159 to reflect this addend. The other addend is set into register 249 by the appropriate manipulation of flip-flops 251, 253, 255, 257, 259 and 261 to reflect this other addend. The mode switches 287, 289, 291, 293 and 295 are positioned in their add mode positions. Of course, the limitation in the addition of two addends with the reflection of their sum in binary accumulator register 249 is the fact that the binary accumulator register 249 is a six binary digit or six "bit" register of six corresponding flip-flops 251, 253, 255, 257, 259 and 261; and hence the sum of the two addends can not exceed 63=(111111), which of course is the physical capacity of the binary accumulator register 249.

Moreover, a salient factor that should be mentioned is the fact that only four impulsing balls 17 are required for the computer operation of the addition of the addend contained in register 151 to the addend contained in binary accumulator register 249, and with auto-manual switch 231 in its automatic position the fifth impulsing ball will permit the binary digital computer to be rendered for automatic operation with the automatic gating mechanism 19 rendered inoperative by this fifth impulsing ball, as will be described.

To explain how the addition operation of the binary digital computer is carried out, let us add the addend 11=(1011) which is already reflected in the register 151 in FIG. 1 of the drawings to an arbitrary addend binary number 21=(010101) set into register 249 to obtain the sum 32=(100000) in binary accumulator register 249. The first impulsing ball will impulse flip-flop 63 to the left, impulse flip-flop 65 to the left, impulse flip-flop 99 to the right with the ball taking the path along decline guide 109, impulse flip-flop 257 to its "1" position, the register 249 will read 29=(011101), the ball will travel downwardly and gate the second ball. The second ball 17 will impulse flip-flop 63 to the right, will impulse flip-flop 67 to the left with the second ball taking the path along decline guides 133 and 179, will impulse flip-flop 253 to its "1" position, the register 249 will read 31=(011111), the second ball will travel downwardly and gate the third ball. The third ball will impuse flip-flop 63 to the left, will impulse flip-flop 65 to the right with the third ball taking the path along decline guides 139, 141 and 143, and as the third ball leaves the end of decline guide 143 it will be directed by lever switch 157 into hole 173 dropping to the lower table 191 where it will take the path directed successively by decline guides 205, 207, 209, 211, 213 and 215 to chute 223 and emerging to table surface 3 where the third ball will be directed by decline guide 229 for gating of the fourth ball automatically. The register 249 will still read 31=(011111). The fourth ball will impulse flip-flop 63 to the right, will impuse flip-flop 67 to the right with the fourth ball taking the path along guides 83 and 131, will travel along lever switch 153, decline guide 177 to flip-flop 251 which will be impulsed to its "0" position by the fourth ball, will travel along decline guide 179 to flip-flop 253 which will be impulsed to its "0" position by the fourth ball, will travel along decline guide 181 to flip-flop 255 which will be impulsed to its "0" position by the fourth ball, will travel along decline guide 183 to flip-flop 257 which will be impulsed to its "0" position by the fourth ball, will travel along decline guide 325 to flip-flop 259 which will be impulsed to its "0" position by the fourth ball, will travel along decline guide 327 to flip-flop 261 which will be impulsed to its "1" position, the fourth ball will travel along decline guide 285 and then downwardly to gate the fifth ball. The register 249 will read 32=(100000) which is the answer desired. The fifth ball will impulse flip-flop 63 to the left, impulse flip-flop 65 to the left, successively impulse flip-flops 99, 101 and 103 to their "1" positions and then the fifth ball will travel along decline guides 117, 123, 127, 125, 129 and 237 thereby rendering the automatic gating mechanism inoperative.

The computer can be utilized to perform subtraction wherein the subtrahend is taken away or removed from the minuend with the remainder or difference indicated in the register 249. The computer performs subtraction by addition of the minuend and the two's complement of the subtrahend. The minuend is set into register 151 by appropriate manipulation of its lever switches 153, 155, 157 and 159 to reflect the minuend. Next the subtrahend is set into register 249 by appropriate manipulation of its flip-flops 251, 253, 255, 257, 259 and 261 to reflect the minuend. In the alternative, the flip-flops 251, 253, 255, 257 can be manually positioned in their "0" positions with the subtrahend reflected in register 249 by successively triggering of the required number of balls racked in decline guide 15. Automatic means are provided to clear the accumulator register 249. To clear register 249 means the positioning of flip-flops 251, 253, 255, 257, 259 and 261 in their "0" positions.

Figure 4:
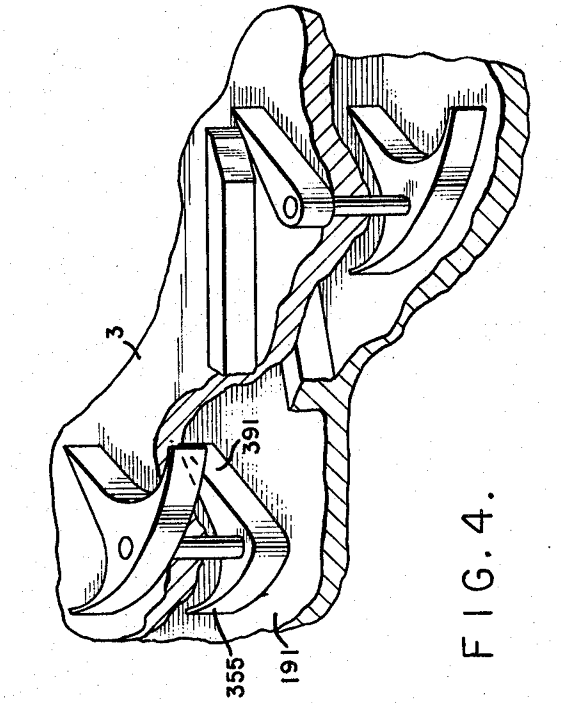
FIG. 4 is a partial view in perspective of a portion of the invention.

With reference to FIGS. 2 and 4, the pins utilized to pivotally mount flip-flops 251, 253, 255, 257, 259 and 261 provide common pivotal mounting of respective partial flip-flops 329, 331, 333, 335, 337 and 339 mounted on lower table surface 191. Switch 341 comprising a pivotally mounted lever is positionable to the left upon its abutment against limit block 343 and to the right upon its abutment against limit block 345 as shown in FIG. 1. When switch 341 is in its right position, a ball will engage guide 347 and drop down hole 349 to the lower table surface 191. When switch 341 is in its left position, a ball will engage guide 351 and drop down hole 353 to the lower table surface 191. Each of the partial flip-flops 329, 331, 333, 335, 337 and 339 as constructed and as arranged in pivotal mounting on lower table surface 191 has only one activating arm 355 which is oriented to the left in contrast to flip-flop which has a left activating arm and a right activating arm. Hence, a ball traveling in the path between decline guides 357, 359, 361, 363, 365, 367, 369, 371, 373, 375, 377, 379, 381, 383, 385, 387, 389 will engage the stems 391 of these partial flip-flops as arranged in FIG. 1 and travel slightly to the right without any impulse imparted to these partial flip-flops. The partial flip-flops as arranged in FIG. 1 correspond to the "0" position of the flip-flops of register 249. When the stems of the partial flip-flops are positioned to the right such positioning will correspond to the "1" position of the flip-flops of register 249 exposing their activating arms 355 for impulsing by a ball to return the flip-flops of register 249 to their "0" position or to express it in another manner to clear the accumulator register 249.

Acordingly, if any of the flip-flops of the accumulator register 249 are in their "1" positions and if multiply switch is off, add-one switch 239 is off and switch 341 is to the right, one triggered ball will eventually drop through hole 349 to the lower table surface 191 and impulse any of the partial flip-flops and their associated flip-flops from their "1" positions to their "0" positions.

With reference to FIGS. 2 and 4, the pins utilized to pivotally mount mode switches 287, 289, 291, 293 and 295 provide common pivotal mounting of respective flip-flops 393, 395, 397, 399 and 401 mounted on lower table surface 191. The positions of flip-flops 393, 395, 397, 399 and 401 shown in FIG. 2 correspond to the add positions of respective mode switches 287, 289, 291, 293 and 295 of FIG. 1. Accordingly, if multiply switch is off, add-one switch 239 is off and switch 341 is to the left, one triggered ball will eventually drop through hole 353 to the lower table surface 191, travel along decline guides 403, 405 and 361, impulse flip-flop 393 to the right, travel along decline guide 407, impulse flip-flop 395 to the right, travel along decline guide 409, impulse flip-flop 397 to the right, travel along decline guide 411, impulse flip-flop 399 to the right, travel along decline guide 413, impulse flip-flop 401 to the right and travel along decline guide 217 to and through chute 223 to table surface 3. As a result thereof, mode switches 287, 289, 291, 293 and 295 will be positioned in their complement mode.

To continue with the subtraction operation of the computer wherein the subtrahend is to be taken away or removed from the minuend with the remainder or difference to be indicated in register 249 and wherein the minuend has already been set into register 151. The subtrahend is then set into register 249 by appropriate manipulation of its flip-flops; or, alternatively, register 249 can be cleared as previously described and then the subtrahend counted into cleared register 249 by counting through successive triggering of the required number of balls as previously described. Next the mode switches 287, 289, 291, 293 and 295 are either manually positioned in their complement positions, or are positioned in their complement positions by causing a ball to be introduced through hole 353 as previously described. Next with the add-one switch 239 in the "on" position a ball triggered will change the subtrahend in register 249 to its one's complement. For example, let us assume the subtrahend is 9=(001001). By the operation described of changing the subtrahend to its one's complement the triggered ball will impulse flip-flop 251 to its "0" position, will travel along decline guide 179 to flip-flop 253 and impulse flip-flop 253 to its "1" position, will travel along guide 277, switch 289, guide 309 to flip-flop 255 and impulse flip-flop 255 to its "1" position, will travel along guide 279, switch 291, guide 311 to flip-flop 257 and will impulse flip-flop 257 to its "0" position, will travel along guide 325 to flip-flop 259 and impulse flip-flop 259 to its "1" position, will travel along guide 283, switch 295, guide 315 to flip-flop 261 and will impulse flip-flop 261 to its "1" position with the result that register 249 will read 54=(110110) which is the one's complement of 9=(001001). Next with add-one switch in the off position a ball is caused to be introduced through hole 353 again to position mode switches 287, 289, 291, 293 and 295 in their add mode. Next with add-one switch in the on position a triggered ball will add 1=(000001) to the number 54=(110110) in register 249 to reflect the number 55=(110111) in register 249, and which number is the two's complement of 9=(001001). Let us further assume that the minuend in register 151 is 11=(1011). The next operation to perform is to perform addition of the addend (minuend) in register 151 and the addend (subtrahend) in register 249 following the procedure as previously outlined with respect to the addition of the two addends and the reflection of their sum in register 249. Such addition of addend (minuend) number 11=(1011) in register 151 and addend (subtrahend) number 55=(110111) in register 249 will exceed the capacity of 63=(111111) of register 249 and effect an overflow of 2=(000010) which is the correct answer for the subtraction performed. Thus, the true result $(66)_{10}$ has been reduced by $2^6=64$ which is one more than the maximum number which the accumulator register 249 will accommodate. In a case such as this the true answer is said to be reduced modulo 64.

In all arithmetic operations although the answer may be incorrect because of overflow the answer in general will be the remainder when the true answer is divided by 64. This modular arithmetic is used to advantage in pseudo random number generation in computers.

The computer can be utilized to count any number of balls automatically and when the desired number of balls have been counted out the gating mechanism 19 in its automatic position will cease to operate. This is accomplished by setting the two's complement of the number in register 249 as previously described. With multiply switch 55 in its off position, with add-one switch 239 in its on position, with auto-manual switch 231 in its automatic position and with mode switches 287, 289, 291, 293 and 295 in their add positions, all that is necessary is the initial manual triggering of gating mechanism 19. If the desired number of balls to be counted out is represented by N, N−1 balls triggered will impulse all of the flip-flops of register 249 to their "1" positions and the N ball will then impulse flip-flops of register 249 to their "0" positions with the N ball traveling along decline guide 273 thereby rendering inoperative the automatic gating mechanism and thus stopping on an accumulator "overflow."

The computer can be utilized to perform multiplication by repeated addition from the memory or multiplicand register 151 into the binary accumulator register 249 which becomes the product register. The procedure followed and previously described for addition of the addend in register 151 to the addend of register 249 is the same procedure followed in multiplication with the added requirement that the multiplier be set into multiplier register 97. On each cycle of four impulsing balls, the multiplier register 97 will be counted down by 1 and then multiplicand in register 151 added to the product register or binary accumulator register 249. Initially, of course, the flip-flops of register 249 will be set to their "0" positions. For example, let us set 3=(011) in multiplier register 97 and 11=(1011) in multiplier register 151 to obtain the product of 33=(100001) in register 249. To reflect the product of 33=(100001) in register 249 requires three cycles of four balls for a total of twelve impulsing balls. Thirteen balls will render the multiplication entirely automatic. The first impulsing ball will impulse flip-flop 99 to its "0" position; the fifth impulsing ball will impulse flip-flop 99 to its "1" position and impulse flip-flop 101 to its "0" position; the 9th impulsing ball will impulse flip-flop 99 to its "0" position; the thirteenth impulsing ball will successively impulse flip-flops 99, 101 and 103 to their "1" positions with the thirteenth ball traveling along decline guides 123, 127, 125, 129, 117 and 237 thereby rendering inoperative the automatic gating mechanism. The second, sixth and tenth balls will follow the same path traveled by the second ball in addition; the third, seventh and eleventh balls will follow the same path traveled by the third ball in addition; the fourth, eighth and twelfth balls will follow the same path traveled by the fourth ball in addition. The result of the three cycles will reflect the three addition of the addend (multiplicand) register 151 into accumulator (product) register 249 of the number 33=(100001).

If the multiplier 2=(010) were set into register 97 and the multiplicand remained the same 11=(1011), it would be observed that the product in register 249 would be 22=(010110) which is the number 11=(1011) shifted left one place. If the number 22=(010110) were divided by two, one would observe that the answer would be 11=(001011). Therefore successive one place shifts to the left of the accumulator multiply by two while one place successive shifts to the right divide by two.

When the lever switches of register 151 are in their positions as shown in FIG. 1, the flip-flops of register 249 are in their positions as likewise shown in FIG. 1 and the computer is operating to add the addend of register 151 to register 249, an impulsing ball traveling along decline guide 131 to switch 153 and then traveling along switch 153 will interrogate or read out the information stored by switch 153. This interrogation or reading out is characterized as nondestructive because the information stored by switch 153 remains unchanged. This impulsing ball then will continue to travel along decline guide 177 to flip-flop 251 and impulse or change the state of flip-flop 251 from its "0" position to its "1" position. This type of interrogation or reading out is characterized as destructive read out because the information stored in flip-flop 251 prior to being impulsed is lost after being impulsed.

As used in the claims, the term logic elements refer to multiply switch 55, flip-flops 63, 65 and 67 of distributor 61, flip-flops 99, 101 and 103 of multiplier register 97, lever switches 153, 155, 157 and 159 of multiplicand register 151, add-one switch 239, flip-flops 251, 253, 255, 257, 259 and 261 of binary accumulator register 249, mode switches 287, 289, 291, 293 and 295, partial flip-flops 329, 331, 333, 335, 337 and 339, switch 341, flip-flops 393, 395, 397, 399 and 401, and inhibited flip-flops 539, 541 and 543; and the term impulsing means refer to the balls 17.

Figure 6:
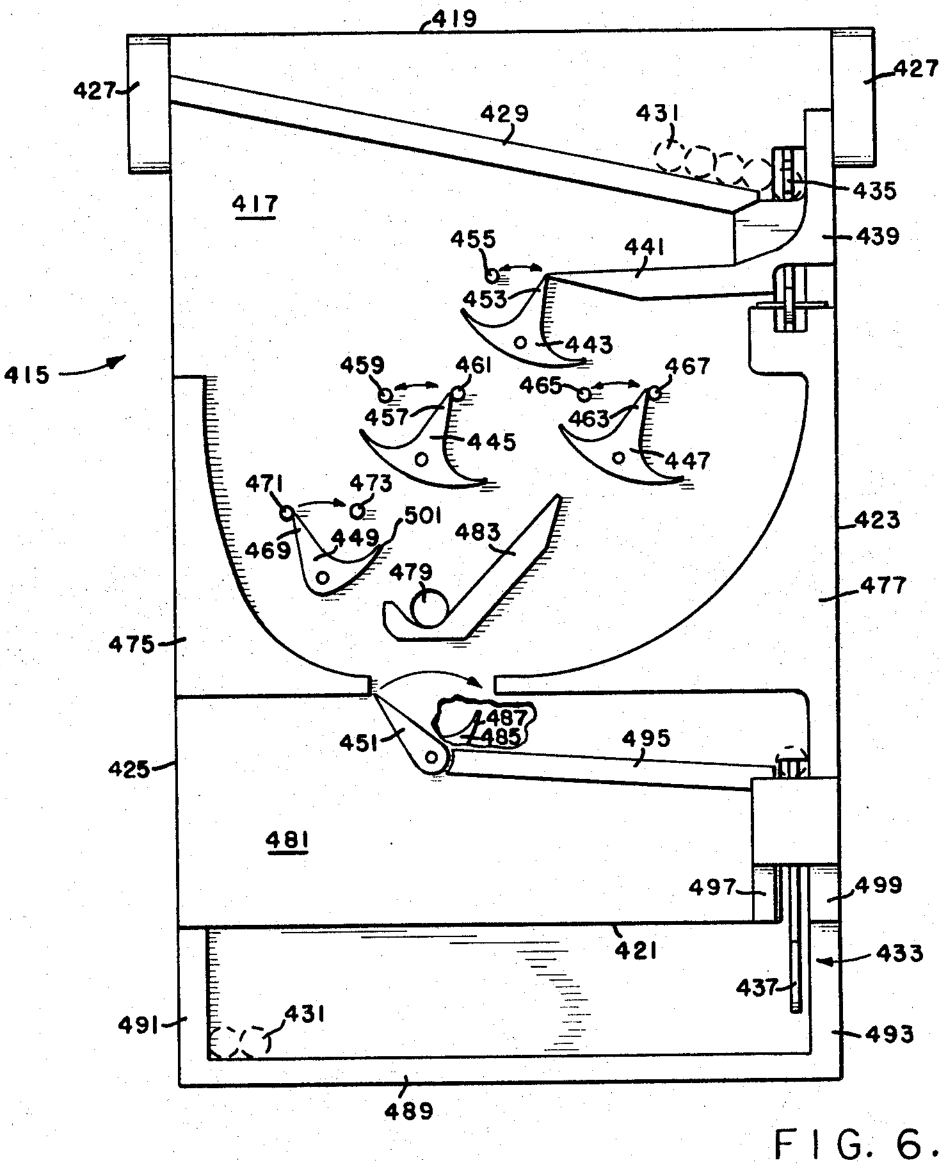
FIG. 6 is an embodiment of a game in associative relationship to the invention.
Figure 5:
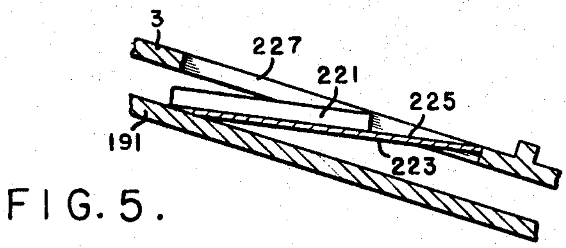
FIG. 5 is a view taken along the line 5—5 of FIG. 1.

In FIG. 6 of the drawings, reference numeral 415 generally refers to an embodiment of a game in associative relationship to the computer invention and showing a table surface 417 having a top 419, bottom 421, right side 423 and left side 425. Table surface 417 is inclined by two depending legs 427, each one of which is suitably secured to the right and left sides of table surface 417 at the top position thereof. Decline guide 429 functions as a storage rack for the balls 431 which are released one at a time by the gating mechanism generally referred to by reference numeral 433. Though on a reduced scale, gating mechanism 433 is similar in construction to and operation of the gating mechanism 19 and has a similar upstanding lifting tab 435 for balls 431 and trigger 437.

Upon being gated or triggered a ball 431 will be lifted over decline guide 425 and travel to the left along the arcuate curved inward portion of L-shaped guide 439 to and along decline guide 441. Pins carried by table surface 417 pivotally mount flip-flops 443, 445 and 447, partial flip-flop 449 and lever turn switch 451. Abutment of stem 53 of flip-flop 443 against limit post 455 limits movement to the left and abutment of stem 453 against decline guide 441 limits movement to the right. Abutment of steam 457 of flip-flop 445 against limit post 459 limits movement to the left and abutment stem 457 against limit post 461 limits movement to the right. Abutment of stem 463 of flip-flop 447 against limit post 465 limits movement to the left and abutment of stem 463 against limit post 467 limits movement to the right. Abutment of stem 469 of partial flip-flop 449 against limit post 471 limits movement to the left and abutment of stem 469 against limit post 473 limits movement to the right. Movement to the left of the end of lever 451 is limited by abutment against L-shaped guide 475 having an arcuately curved inward portion and movement to the right of the end of lever 451 is limited by abutment against L-shaped guide 477 having an arcuately curved inward portion. Hole 479 formed through table surface 417 communicates with lower table surface 481 suitably secured in spaced relationship from table surface 417. A ball 431 traveling down table surface 417 and engaging hook-shaped guide 483 will be directed through hole 479 to lower surface 481. Turn switch 451 in its left position denotes the machine's turn and turn switch 451 in its right position denotes the player's turn. Carried on common pin pivotally mounted switch 451 is partial flip-flop 485 having its activating arm 487 oriented to the right. When lever 451 is in the machine's turn, a ball 431 constrained to drop through hole 479 will engage arm 487 and impulse partial flip-flop 485 to the right thereby flipping the turn switch 451 to the player's turn. The ball 431 will be collected in the receptacle formed by the bottom portion 489, left portion 491 and right portion 493 upstanding from the lower table surface 481 and coplanar with table surface 417. When switch 451 is in its machine's turn, a ball traveling on table surface 417 along switch 451 and guide 495 will be directed downwardly between guides 497 and 499 to engage and depress trigger 437 thereby gating automatically another ball. When switch 451 is in its player's turn, a ball traveling on table surface 417 between guides 475 and 477 will be directed along lever 451 to bottom 421 to drop into the collecting receptacle.

Game 415 is utilized to play a game of fifteen balls racked on guide 429. The two opponents are the machine or game itself and a player. Fifteen playing balls constitute an arbitrary number for explaining the game, play and procedure followed. More or less than the arbitrary number of fifteen balls can be utilized. The player elects to start or to have the machine start with alternating turns of play, and at each respective turn of play, the player or machine gates one, two or three balls. Whoever is left with one ball to gate loses the game. To start the game, the flip-flops 443, 445 and 447 and partial flip-flop 449 are positioned as shown in FIG. 6. It should be noted that flip-flops 443, 445 and 447 constitute a distributor similar in construction to and function as distributor 61. Flip-flops 443, 445 and 447 function to cyclically distribute and direct balls 431 in four discrete but nonsequential paths A, B, C, D. The winning strategy is to get into and stay in the winning mode accomplished by the player by his choosing the right number of balls at each of his turns to leave the machine one more than a multiple of four balls. Furthermore, with flip-flops 443, 445 and 447, and partial flip-flop 449 in their positions of FIG. 6, path B may be regarded as the winning path and path C as the losing path. If the player at any time during his turn is able to stop his ball on path B, he will be in the winning mode so long as he does not make a mistake and fail at his successive turns to stop his ball on path B. The machine will then be forced to the losing path C. To further clarify and explain: the strategy followed by the machine is simple. The machine will stop its turn either on path B or C. Thus if the machine's turn starts with path D, A, or B, it will stop on B to be in the winning mode; but if the machine's turn starts with path C, it will also stop on C to be in the losing mode. It should be clear that if the player on his turn takes path C either as a first, second or third path the machine will stop on path B to force the player to take path C as his first choice on his next turn of play. The machine's strategy is altered to also stop on path A on its first choice if it goes first thereby permitting the player the chance to win. Having taken path A once, however, partial flip-flop 449 is impulsed and the machine will not stop on path A on any of its successive turns of play.

The first gated ball in its A path will impulse flip-flops 443 and 445 to the left and partial flip-flop 449 to the right upon engaging activating arm 501 and drop into hole 479. The second gated ball in its B path will impulse flap-flops 443 and 447 to the right and left, respectively, and drop into hole 479. The third gated ball in its C path will impulse flip-flop 443 to the left, impulse flip-flop 445 to the right and drop into hole 479. The fourth gated ball in its D path will impulse flip-flops 443 and 447 to the right with the ball traveling along guide 477. The fifth gated ball cyclically will take path A to impulse flip-flops 443 and 445 to the left and travel to the left along partial flip-flop 449 and guide 475.

By reference to the previous description of the game, it should be appreciated that the player must gate each ball by manually depressing trigger 437 each time. It should further be appreciated that at each turn of the machine trigger 437 need be manually depressed once and if the machine selects two or three balls for gating, such gating will be automatic. For example, if the player takes the first turn and gates three balls and flips turn switch to the machine's turn, the fourth ball gated upon the machine's turn will take the D path to travel along guides 477 and 495 to automatically gate the fifth ball which will take the A path of the second cycle to travel along guides 475 and 495 to automatically gate the sixth ball which will take the B path of the second cycle to drop into hole 479, engage activating arm 487, impulse partial flip-flop 485 to the right and flip turn switch 451 to player's turn.

Even if the machine plays first the player is given the opportunity to win because the machine is required to make an error on its first turn. This error factor arises from the fact that partial flip-flop 449 is positioned to the left with the result that the first ball will take path A to impulse partial flip-flop 449 to the right to drop into hole 479 thereby flip turn lever 451 to player's turn. If partial flip-flop 449 were positioned to the right prior to the machine's gating of the first ball, the first ball would then take A path to the left of partial flip-flop 449 traveling along guides 475 and 495 to automatically gate the second ball which will take the winning mode of the B path with the second ball dropping into hole 479 to flip turn lever 451 to player's turn. In other words, if the machine takes the first turn and if the partial flip-flop 449 is prior positioned to the right, it would be impossible to beat the machine.

As used in the claims, the term impulsing means refer to balls 431; and the term logic elements refer to flip-flops 443, 445 and 447, partial flip-flops 449 and 485 and lever turn switch 451.

With reference to FIG. 7 of the drawings it should be noted that the reference numerals applied to the flip-flop per se were in sequence in the description of the flip-flops of the computer invention although FIG. 7 clearly shows the flip-flop in associative structural embodiment in relation to flip-flop 445. Since FIG. 7 was used to clarify the function of a flip-flop per se in the computer invention in relation to its structure, additional reference numerals have not been applied to the flip-flop per se to avoid confusion.

Figure 8:
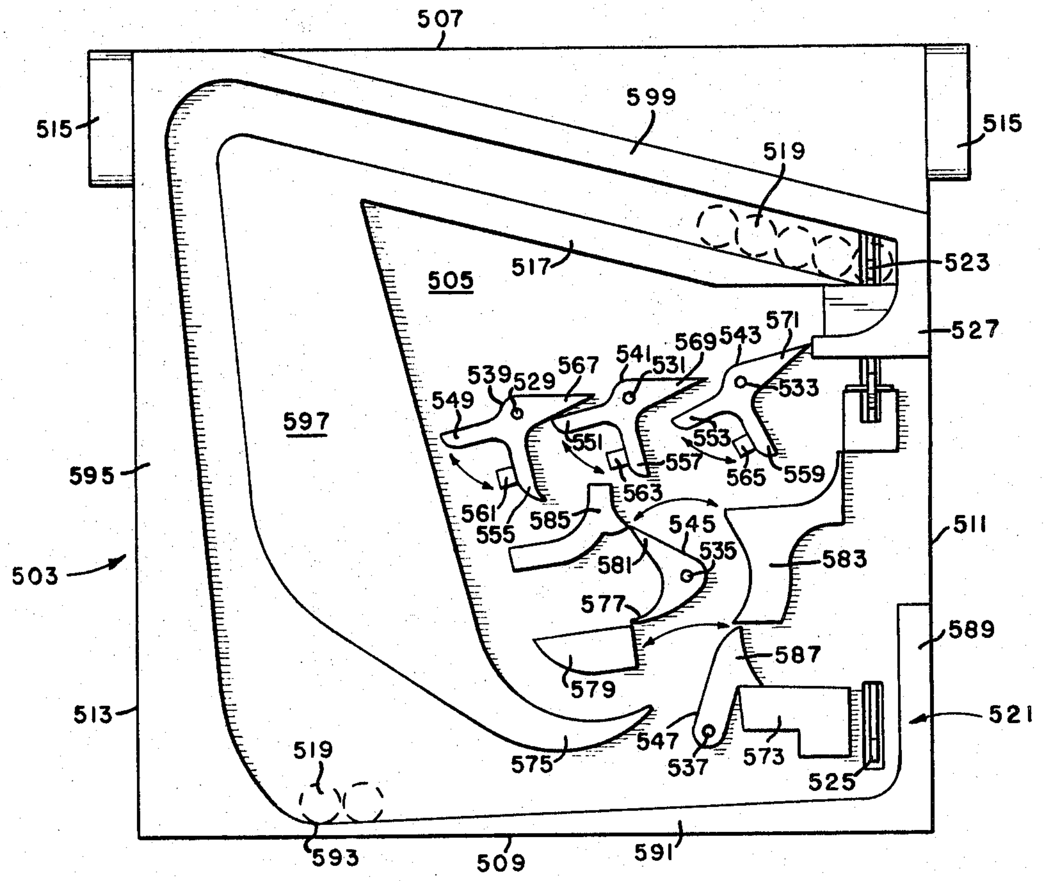
FIG. 8 is another embodiment of a game in associative relationship to the invention.

In FIG. 8 of the drawings, reference numeral 503 generally refers to another embodiment of a game in associative relationship to the computer invention and showing a table surface 505 having a top 507, bottom 509, right side 511 and left side 513. Table surface 505 is inclined by two depending legs 515, each one of which is suitably secured to the right and left sides of table surface 505 at the top portion thereof. Decline guide 517 functions as a storage rack for the balls 519 which are released one at a time by the gating mechanism generally referred to by reference numeral 521. Though on a reduced scale, gating mechanism 521 is similar in construction to and operation of gating mechanism 19 and has a similar upstanding lifting tab 523 for balls 519 and trigger 525.

Upon being gated or triggered a ball 519 will be lifted over decline guide 517 and travel to the left along the arcuate curved inward portion of L-shaped guide 527. Pins 529, 531, 533, 535 and 537 carried by table surface 505 pivotally mount inhibited flip-flops 539, 541 and 543, partial flip-flop 545 and lever turn switch 547, respectively. The individual flip-flops 539, 541 and 543 are T-shaped and have respective left activating arms 549, 551 and 553; respective stems 555, 557 and 559 which, as shown in FIG. 8, abut respective limit blocks 561, 563 and 565; and respective path limiting arms 567, 569 and 571.

Inhibited flip-flops 539, 541 and 543 in functional intercooperation with one another and limit blocks 561, 563 and 565 function as a distributor which will cyclically distribute and direct balls 519 in four discrete and sequential paths characterized as A, B, C and D. This distributor is different from distributor 61 of the computer invention in that distributor 61 will cyclically distribute and direct balls 17 in four discrete but non-sequential paths. This distributor may be substituted for the distributor 61 of the computer invention without affecting the functional result obtained by distributor 61. These four paths may be designated A, B, C and D. With inhibited flip-flops 539, 541 and 543 in their positions as shown in FIG. 1, the first gated ball will successively travel along path limiting arms 571, 569 and 567 to left activating arm 549 whereupon the first gated ball will take path A by impulsing left activating arm 549 downwardly abutting same against limit block 561. The second gated ball will successively travel along path limiting arms 571 and 569, and along left activating arm 551 to engage and be stopped by path limiting arm 567 whereupon the second gated ball will take path B by impulsing left activating arm 551 downwardly abutting same against limit block 563 and causing by the engagement of left activating arm 551 with stem 555 the inhibited flip-flop 539 to return to its original position as shown in FIG. 8. The third gated ball will successively travel along path limiting arm 571 and left activating arm 553 to engage and be stopped by path limiting arm 569 whereupon the third gated ball will take path C by impulsing left activating arm 553 downwardly abutting same against limit block 565 and causing by the engagement of left activating arm 553 with stem 557 the inhibited flip-flop 541 to return to its original position as shown in FIG. 8. The fourth gated ball will take path D by impulsing stem 559 downwardly in abutting relationship with limit block 565. From the foregoing description of the inhibited flip-flops 539, 541 and 543, and their functional interrelationships with one another it should be appreciated that flip-flops 539, 541 and 543 are arranged on table surface 505 in ascending order from left to right. Each of the inhibited flip-flops interact with an adjacent inhibited flip-flop such that an adjacent lower one of the inhibited flip-flops is closed the adjacent upper one is inhibited from flipping when impulsed; hence, the inhibited flip-flops are free to flip successively from the lowest and in ascending order.

Game 503 has the same rules as game 415 and can be played utilizing more or less than the arbitrary number of fifteen balls. Lever turn switch 547 abutting guide 573 denotes the player's turn and lever turn switch abutting arcuate decline guide 575 denotes the machine's turn. When fifteen balls 519 are racked on decline guide 517, inhibited flip-flops 539 and 541 are in their positions shown in FIG. 8 and inhibited flip-flop 543 is opened with left activating arm 553 in abutting relationship against limit block 565. The first gated ball will take the path described previously as the D path but which path is designated as the A path for purposes of describing play of game 503 using fifteen racked balls 519. Hence, the formerly described and designated A path, B path, C path and D path become the B path, C path, D path and A path for this explanation. As were the cases in game 415, the winning mode for game 503 is the B path and the losing mode is the C path. When the left oriented activating arm 577 of partial flip-flop 545 abuts decline guide 579 as shown in FIG. 8, partial flip-flop 545 is in its "off" position. When the stem 581 of partial flip-flop 545 abuts arcuate decline guide 583, partial flip-flop 545 is in its "on" position. When the machine plays first with partial flip-flop 545 in its off position, the machine will always win. However, when the machine plays first with partial flip-flop 545 in its on position, the machine will initially commit an error allowing the player to seize the advantage and win. For purposes of further clarification: when the machine plays first with partial flip-flop 545 in its "off" position, the first gated ball will take the A path successively to engage and impulse stem 559 downwardly, travel along arcuate decline guides 583 and 585, will travel along partial flip-flop 545 and the arcuate portion 587 of lever turn switch 547, will travel along decline guide 573 and be directed downwardly between decline guide 573 and guide 589 thereby depressing trigger 525 and automatically gating the second ball. The second ball will successively travel along path limiting arms 571, 569 and 567 to left activating arm 549 taking the B path by impulsing left activating arm 549 downwardly and traveling along arcuate decline guide 575 to engage and flip lever turn switch 547 by impulsing same to the player's turn and dropping to the bottom guide 591 and traveling to lowermost collecting point 593. Since the machine has taken the B path it will be in the winning mode. When the partial flip-flop 545 is in its "on" position the machine's first ball will take the A path as previously described traveling along arcuate decline guide 583, decline guide 579 and arcuate decline guide 575 thereby flipping lever turn switch 547 to the player's turn thereby allowing the player to gate one ball to take the B path for the player to be in the winning mode.

To rack the balls along decline guide 517 collected in bottom guide 591, the table surface 505 is tipped in such a manner to permit the balls 519 to be directed between lateral return guides 595 and 597 and between upper return guide 599 and decline guide 517.

As used in the claims, the term impulsing means refer to balls 519; and the term logic elements refer to inhibited flip-flops 539, 541 and 543, partial flip-flop 545 and lever turn switch 547.

In the computer 1, game 415 and game 503, all of the guides and blocks are fixed to the respective table surfaces.

Having thusly described my invention, I claim:

1. A mechanical binary digital computer comprising impulsing means, table surfaces; a distributor comprising a plurality of flip-flops pivotally mounted upon said table surfaces, each of said flip-flops having a first stable position and a second stable position, said flip-flops being arranged pyramidially in tiers, each of said tiers containing at least one more flip-flop than the next preceding tier upward, each of said flip-flops being cooperatively disposed with two flip-flops of the next succeeding downward tier so as to cause said impulsing means to impulse one of said flip-flops of said next succeeding downward tier when said flip-flop is impulsed while it is in its first stable position and to cause said impulsing means to impulse the other of said flip-flops of said next succeeding downward tier when said flip-flop is impulsed while in its said second stable position, the distributor thereby causing said impulse means to follow discrete paths cyclically; an accumulator register, comprising a plurality of flip-flops pivotally mounted upon said table surfaces, each of said flip-flops having a first stable position and a second stable position, each one of said flip-flops being disposed vertically of each other; first guide means, cooperatively disposed with said accumulator register upon said table surfaces so as to cause said impulsing means to impulse the next succeeding downward flip-flop when the next preceding upward flip-flop is impulsed while in its said first stable position and to cause said impulsing means to cease impulsing when said next preceding upward flip-flop is impulsed while in its said second stable position; and an addend register, comprising a plurality of switches pivotally mounted upon said table surfaces, each of said switches having a first position and a second position, each said switch being cooperatively disposed with one of said discrete paths of said impulsing means and one of said flip-flops of said accumulator register so as to cause said impulsing means travelling along said respective discrete path to impulse said respective flip-flop when said switch is in its said first position and to cause said impulsing means travelling along said respective discrete path to cease impulsing when said switch is in its said second position.

2. A mechanical binary digital computer in accordance with claim 1, further comprising a multiplier register, comprised of a plurality of flip-flops pivotally mounted upon said table surfaces, each of said flip-flops having a first stable position and a second stable position, each of said flip-flops being disposed vertically of each other; second guide means, cooperatively disposed with said multiplier register upon said table surfaces so as to cause said impulsing means to impulse the next succeeding downward flip-flop when the next preceding upward flip-flop is impulsed while in its said first stable position and to cause said impulsing means to cease impulsing when said next preceding upward flip-flop is impulsed while in its said second stable position, said multiplier register being disposed so as to receive said impulsing means from along only one of said discrete paths.

3. A mechanical binary digital computer in accordance with claim 1, wherein said switches of said addend register comprise manually operated lever switches.

4. A mechanical binary digital computer in accordance with claim 1, wherein said first guide means comprise a plurality of switches pivotally mounted upon said table surfaces, each of said switches having a first position and a second position, each one of said switches being cooperatively disposed with each respective one of said flip-flops of said accumulator register so as to cause said impulsing means to impulse the next succeeding downward accumulator register flip-flop when the preceding upward accumulator register flip-flop is impulsed while in its said first stable position in conjunction with said guide means switch being in its said first position or when said preceding upward accumulator register flip-flop is impulsed and said guide means switch is in its said second position.

5. A mechanical binary digital computer in accordance with claim 1, further comprising a plurality of partial flip-flops, each partial flip-flop having a first stable position and a second stable position, each partial flip-flop being affixed to one respective flip-flop of said accumulator register and rotatable therewith, each said partial flip-flop being disposed vertically of each other and third guide means, cooperatively disposed with said partial flip-flops on said table surfaces so as to cause said impulsing means to impulse each partial flip-flop when said partial flip-flop is in said first stable position and to cause said impulsing means to fail to impulse said partial flip-flop when said partial flip-flop is in said second stable position.

6. A mechanical binary digital computer in accordance with claim 4, further comprising a plurality of flip-flops pivotally mounted upon said table surfaces, each of said flip-flops having a first stable position and a second stable position, each of said flip-flops being affixed to one respective switch of said first guide means and rotatable therewith, each said flip-flop being disposed vertically of each other and fourth guide means, cooperatively disposed with said flip-flops on said table surfaces so as to cause said impulsing means to impulse each said flip-flop upon impulsing of the preceding upward flip-flop.

7. A mechanical binary digital computer in accordance with claim 1, wherein said impulsing means comprise balls impelled by gravitational force.

8. A mechanical binary digital computer in accordance with claim 7, wherein is further provided a gating mechanism for automatic gating of said balls one at a time.

9. A mechanical binary digital computer in accordance with claim 2, wherein said impulsing means comprise balls.

References Cited

UNITED STATES PATENTS

| | | | |
|---|---|---|---|
| 2,058,202 | 10/1936 | Anderson | 273—121 |
| 2,086,327 | 7/1937 | Hameetman | 273—131 |
| 2,115,620 | 4/1938 | Cave | 35—32 |
| 2,571,521 | 10/1951 | Barnhart | 273—120 |
| 3,006,082 | 10/1961 | Libbey | 35—32 |
| 3,074,638 | 1/1963 | Bible et al. | 235—167 |
| 3,278,187 | 10/1966 | Sinden | 273—118 |
| 3,331,143 | 7/1967 | Weisbecker | 35—30 |

EUGENE R. CAPOZIO, *Primary Examiner.*

W. GRIEB, *Assistant Examiner.*